UNITED STATES PATENT OFFICE.

ANDREW J. ROWLAND, OF CINCINNATI, OHIO, ASSIGNOR TO THE FEDERAL PRODUCTS COMPANY, OF CINCINNATI, OHIO, A CORPORATION OF OHIO.

OILPROOF IMPREGNATING AGENT OR COATING AND PROCESS.

1,395,016.  Specification of Letters Patent.  Patented Oct. 25, 1921.

No Drawing.   Application filed July 10, 1920. Serial No. 395,348.

*To all whom it may concern:*

Be it known that I, ANDREW J. ROWLAND, a citizen of the United States, residing at Cincinnati, in the county of Hamilton and State of Ohio, have invented and discovered a certain new and useful Oilproof Impregnating Agent or Coating and Process, of which the following is a specification.

The object of my invention is to produce an economical, efficient and durable coating, impregnating agent, varnish or paint which is odorless, tasteless, and possesses a fair degree of pliability and which, among other uses, is particularly adapted for receptacles for edible fats or oils, such as lard, lard compounds, butter, butter compounds, artificial lards or butters, olive oil, edible food products, such as salmon or other food or milk products which are rich in oil, honey, molasses, syrups, milk, cream and buttermilk, Alginic acid or algin is a comparatively new term to denote a product obtained from kelp or ordinary seaweed. Dry kelp contains about ninety per cent. of alginic acid or algin. The remaining ten per cent. comprises iodin salts and other ingredients. The alginic acid or algin is extracted from kelp by grinding the washed kelp and mixing therewith soda ash or sodium carbonate, then allowing the mixture to stand about twenty to thirty hours and then grinding it up finely or othewise thoroughly mixing said ingredients. The resulting product is sodium alginate, which may contain other chemicals or chemical compounds which are not deleterious for the purposes intended. From this sodium alginate, aluminum alginate or zinc alginate or other metallic salts of alginic acid are prepared by double decomposition. For instance, mixing a solution of zinc sulfate with a solution of sodium alginate which precipitates the insoluble zinc alginate which is then washed free of soluble impurities and is then dissolved by adding a little ammonium hydroxid.

My invention consists in the preparation of the metallic salts of alginic acid by the reaction of the metallic carbonates on the alginic acid or kelp.

My invention also consists in the preparation of zinc alginate by grinding and cutting the wet kelp to a finely divided state, and then adding thereto a sufficient quantity of zinc carbonate, to completely neutralize the alginic acid contained in the kelp.

My invention further consists in the application of said product in its viscous state to paper, pulp, fabric, wood, glass, metallic or other surfaces for the purposes herein set forth.

An advantage of this product is that it forms a coating that is much more oilproof than any other known coating and being insoluble in oil, cannot impart any poisonous products to the materials such as edible oils or fats contained in the receptacle provided with this coating or impregnated therewith. The lining of a glass container with this product renders it useful as a receptacle for hydrofluoric acid which would otherwise penetrate or dissolve the glass.

I have discovered that the metallic salts of alginic acid are highly useful as the base for oilproof and waterproof varnish for aeroplane wings or other aeroplane parts requiring such treatment. The advantage is that the varnish is absolutely oilproof and sufficiently waterproof for this use. Furthermore, it is much cheaper than the cellulose acetate varnishes now in use for this purpose.

Another important application of my invention consists in impregnating or coating containers for paints, varnishes or other oils for commercial use or otherwise, also for containers for alcohol, kerosene, gasolene, benzin, naphtha, acetone, or other commodities of an oily or acid nature.

In the preparation of this coating or impregnating material, metallic salts of alginic acid, either wet or dry, are mixed with the proper amount of water and ammonium hydroxid is then added to bring the metallic salts of alginic acid into solution. I have found that the preferred proportions are approximately one part of metallic salts of alginic acid to one and one-half or two parts of concentrated ammonium hydroxid of the specific gravity of .898 or 25° Baumé, or its equivalent. The same proportions of any of the metallic salts, such as zinc alginate or aluminum alginate will be used. The consistency of the solution may be varied by the amount of water used therein, and this will be regulated by the purposes for which the solution is required, as for instance, on glass or glazed paper, which the product will not penetrate, more water than otherwise may be used in order to produce a very thin solution. After mixing the product in the proportions and manner approximately as above set forth, the solution is then ready for use either as a coating to be applied either by dipping or by a brush, or spraying, or the first coat may be applied by dipping or by a brush and the second coat by spraying or the respective coats may be varied in method of application as desired.

When the product is used as an impregnating material, it is thoroughly mixed with the material such as pulp, in the manufacture of the article, or if the surface is porous such as wood or cloth or soft or porous paper, it will impregnate the same by penetration when applied as a coating by dipping or otherwise.

The amount of water used is immaterial, except for the purpose of regulating and varying the desired degree of consistency and while it is preferably added to the metallic salts of alginic acid before the latter is mixed with the ammonium hydroxid, the consistency may be afterward varied by the introduction of water. The proportions of zinc alginate or other metallic salts of alginic acid to the concentrated ammonium hydroxid remain unchanged regardless of the amount of water used.

What I claim is:

1. A composition of matter consisting of one part of metallic salts of alginic acid to about one and one-half parts of concentrated ammonium hydroxid of a specific gravity of about .898 or 26° Baumé, or its equivalent.

2. The herein described process consisting in mixing zinc carbonate and alginic acid to form zinc alginate, substantially as set forth and for the purposes specified.

3. A composition of matter consisting of one part of zinc alginate to about one and one-half parts of concentrated ammonium hydroxid of a specific gravity of about .898 or 26° Baumé, or its equivalent.

4. The process which consists in reducing kelp to a powder or granular form then adding a quantity of water thereto and then mixing therewith a quantity of zinc carbonate.

5. A composition of matter consisting of one part of metallic salts of alginic acid and one and one-half parts of ammonium hydroxid or its equivalent to bring it into solution.

6. A composition of matter consisting of one part of zinc alginate and one and one-half parts of ammonium hydroxid to bring it into solution.

ANDREW J. ROWLAND.